US012143719B2

(12) United States Patent
Winterton et al.

(10) Patent No.: US 12,143,719 B2
(45) Date of Patent: *Nov. 12, 2024

(54) METHODS AND DEVICES TO IDENTIFY FOCAL OBJECTS

(71) Applicants: STMicroelectronics France, Montrouge (FR); STMicroelectronics, Inc., Coppell, TX (US); STMicroelectronics (Research & Development) Limited, Marlow (GB)

(72) Inventors: Darin K. Winterton, San Jose, CA (US); Donald Baxter, Stirling (GB); Andrew Hodgson, Edingburgh (GB); Gordon Lunn, Linlithgow (GB); Olivier Pothier, Sceaux (FR); Kalyan-Kumar Vadlamudi-Reddy, San Jose, CA (US)

(73) Assignees: STMicroelectronics France, Montrouge (FR); STMicroelectronics, Inc., Coppell, TX (US); STMicroelectronics (Research & Development) Limited, Marlow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,702

(22) Filed: Sep. 20, 2023

(65) Prior Publication Data
US 2024/0015400 A1 Jan. 11, 2024

Related U.S. Application Data

(63) Continuation of application No. 17/987,280, filed on Nov. 15, 2022, now Pat. No. 11,800,224, which is a continuation of application No. 17/122,667, filed on Dec. 15, 2020, now Pat. No. 11,528,407.

(51) Int. Cl.
*H04N 23/67* (2023.01)
*H04N 23/61* (2023.01)

(52) U.S. Cl.
CPC .......... *H04N 23/675* (2023.01); *H04N 23/61* (2023.01); *H04N 23/671* (2023.01)

(58) Field of Classification Search
None
See application file for complete search history.

(56) References Cited

U.S. PATENT DOCUMENTS

| 9,672,594 | B2 | 6/2017 | Humfeld et al. |
| 10,873,738 | B2 | 12/2020 | Retterath |
| 11,477,363 | B2 | 10/2022 | Retterath |
| 11,528,407 | B2 * | 12/2022 | Winterton ............ H04N 23/675 |
| 11,800,224 | B2 * | 10/2023 | Winterton .............. H04N 23/61 |
| 2012/0274785 | A1 | 11/2012 | Takeuchi et al. |
| 2014/0037135 | A1 | 2/2014 | Kutliroff et al. |
| 2018/0089848 | A1 | 3/2018 | Yang et al. |

(Continued)

FOREIGN PATENT DOCUMENTS

WO    2022002974 A1    1/2022

*Primary Examiner* — Cynthia Segura
(74) *Attorney, Agent, or Firm* — Slater Matsil, LLP

(57) ABSTRACT

A method includes dividing a field of view into a plurality of zones and sampling the field of view to generate a photon count for each zone of the plurality of zones, identifying a focal sector of the field of view and analyzing each zone to select a final focal object from a first prospective focal object and a second prospective focal object.

20 Claims, 11 Drawing Sheets

(56) References Cited

U.S. PATENT DOCUMENTS

| | | |
|---|---|---|
| 2019/0212125 A1* | 7/2019 | Deleule ................ G01S 7/4808 |
| 2021/0286319 A1 | 9/2021 | Cole |
| 2022/0136817 A1 | 5/2022 | Yeh et al. |
| 2022/0187431 A1 | 6/2022 | McLeod et al. |
| 2022/0294998 A1 | 9/2022 | Ximenes et al. |
| 2023/0058113 A1 | 2/2023 | Laifenfeld et al. |

* cited by examiner

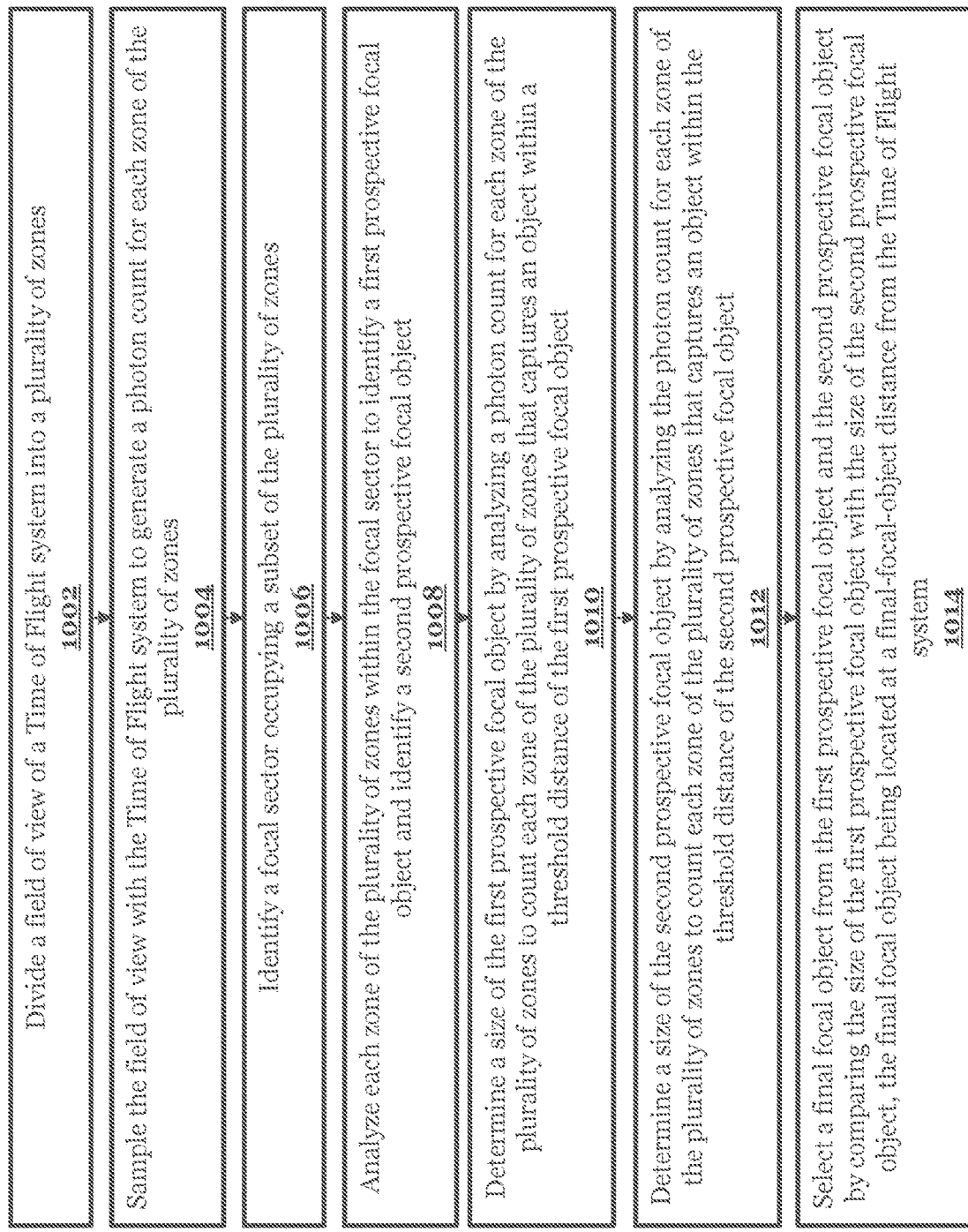

METHODS AND DEVICES TO IDENTIFY FOCAL OBJECTS

CROSS-REFERENCE TO RELATED APPLICATIONS

This application is a continuation of U.S. application Ser. No. 17/987,280, filed on Nov. 15, 2022, which is a continuation of U.S. application Ser. No. 17/122,667, filed on Dec. 15, 2020, now issued as U.S. Pat. No. 11,528,407, which applications are hereby incorporated by reference herein in their entirety.

TECHNICAL FIELD

This application relates to methods and devices for identifying focal objects and distances in a field of view.

BACKGROUND

Time of Flight systems may be used to detect objects and their respective distances from the lens of a camera to provide the camera data needed to focus the camera. This may be referred to as autofocusing. However, many challenges are associated with selecting the appropriate object or distance for autofocusing. Autofocusing may also cause flicker if the focal object distance is subject to abrupt changes.

SUMMARY

In accordance, with an embodiment of the present application, a method to identify a focal object in a field of view, the method may include: dividing a field of view into a plurality of zones; identifying a focal sector occupying a subset of the plurality of zones; analyzing each zone of the plurality of zones within the focal sector to identify a first prospective focal object and to identify a second prospective focal object; determining a size of the first prospective focal object in the field of view and determining a size of the second prospective focal object in the field of view; selecting a final focal object from the first prospective focal object and the second prospective focal object by comparing the size of the first prospective focal object with the size of the second prospective focal object; and focusing a lens of a camera depending on the final focal object.

In accordance, with an embodiment, a Time of Flight system configured to detect a photon count for each zone of a plurality of zones of a field of view includes: a processor in communication with the Time of Flight system and a memory comprising an instruction set to be executed in the processor, the instruction set when executed causing the processor to: identify a focal sector occupying a subset of the plurality of zones, analyze each zone of the plurality of zones within the focal sector to identify a first prospective focal object and to identify a second prospective focal object, determine a size of the first prospective focal object and determine a size of the second prospective focal object, and select a final focal object from the first prospective focal object and the second prospective focal object by comparing the size of the first prospective focal object with the size of the second prospective focal object, the final focal object being located at a final focal object distance from the Time of Flight system. The Time of Flight system may further include a lens focus system configured to focus a lens of a camera depending on the final focal object.

Consistent with an embodiment, a method to identify a focal object in a field of view, the method includes dividing a field of view of a Time of Flight system into a plurality of zones; sampling the field of view with the Time of Flight system to generate a photon count for each zone of the plurality of zones; identifying a focal sector occupying a subset of the plurality of zones; analyzing each zone of the plurality of zones within the focal sector to identify a first prospective focal object and identify a second prospective focal object; determining a size of the first prospective focal object by analyzing a photon count for each zone of the plurality of zones to count each zone of the plurality of zones that captures an object within a threshold distance of the first prospective focal object; determining a size of the second prospective focal object by analyzing the photon count for each zone of the plurality of zones to count each zone of the plurality of zones that captures an object within the threshold distance of the second prospective focal object; selecting a final focal object from the first prospective focal object and the second prospective focal object by comparing the size of the first prospective focal object with the size of the second prospective focal object, the final focal object being located at a final focal object distance from the Time of Flight system; and focusing a lens of a camera depending on the final focal object distance.

BRIEF DESCRIPTION OF THE DRAWINGS

One or more embodiments will now be described, by way of example only, with reference to the annexed figures, wherein:

FIGS. 10A and 10B depict a method to identify a focal object in a field of view in accordance with an embodiment.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Time of Flight (ToF) systems are used in many applications to detect objects in a three-dimensional space. In various embodiments, a Time of Flight system may cast light onto a scene and detect the time it takes for light to be reflected from objects in the scene back to the Time of Flight system. The time, along with the speed of light, can be used to calculate the distances between objects in a three-dimensional environment and the ToF systems. This information can be used in many different ways including selecting an object for an autofocus application for a camera.

Figure 1:
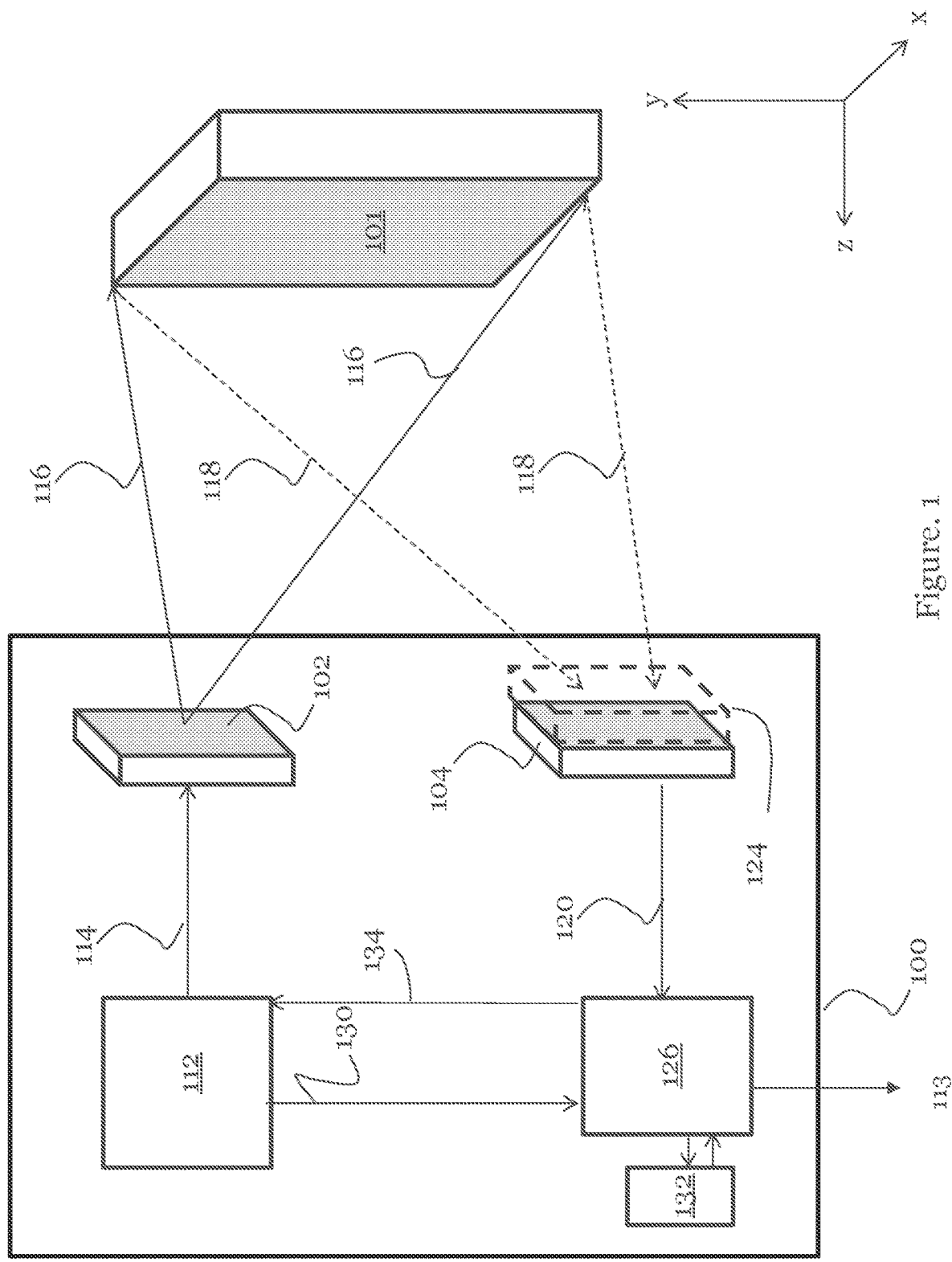
FIG. 1 illustrates a ToF system 100 of an embodiment.

FIG. 1 illustrates a ToF system 100 of an embodiment of the present disclosure.

An object 101 is disposed in a three-dimensional environment positioned in front of the ToF system 100. The ToF system 100 may be used to determine the proximity of the object 101 to the ToF system 100. The object 101 is provided for explanatory purposes. The three-dimensional environment may include additional objects of various shapes or sizes disposed at varying distances from the ToF system wo and the ToF system 100 may determine the proximity of the various objects in the three-dimensional environment. The object 101 may comprise multiple surfaces at various distances from the ToF system 100, and the ToF system wo may determine the depth of the different surfaces of the object 101. The ToF system 100 may simultaneously detect the proximity of additional objects in the three-dimensional environment from the ToF system 100. In various embodiments, the ToF system wo may also comprise a memory 132. The processor 126 may store data in the memory 132 and retrieve data from the memory 132. The memory 132 may be a non-transitory computer-readable medium. The memory 132 may also store programs that may be executed by the processor 126. The programs may comprise instruction sets executed by the processor 126.

The ToF system wo may comprise an optical source 102 and an optical receiver 104.

Figure 2B:
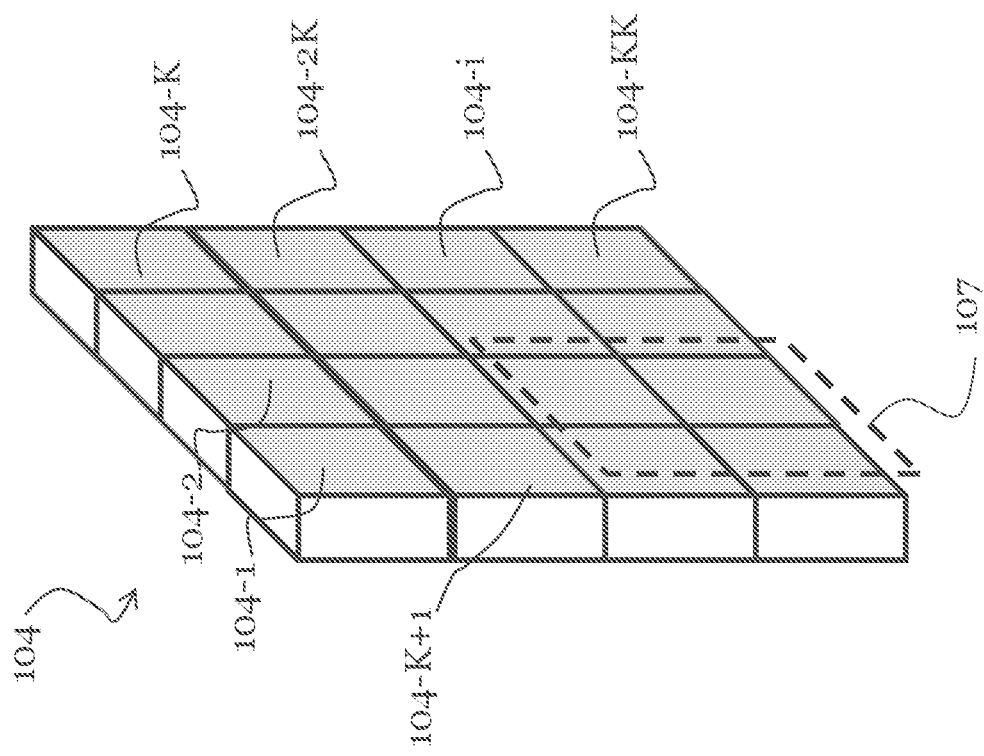
FIG. 2B shows an enlarged view of an optical receiver, in accordance with an embodiment.
Figure 2A:
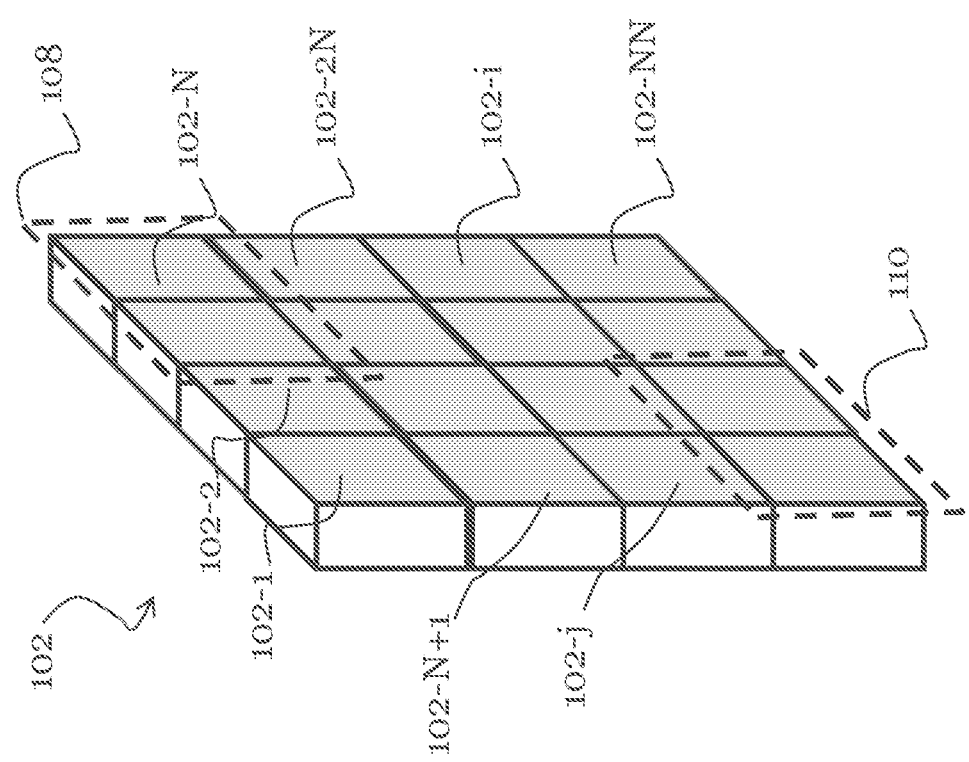
FIG. 2A shows an enlarged view of an optical source, in accordance with an embodiment.

FIG. 2A shows an enlarged view of the optical source 102, in accordance with an embodiment.

As depicted in FIG. 2A, the optical source 102 may comprise a plurality of optical emitters 102-1 to 102-NN arranged as an array. Although the example of FIG. 2A illustrates the optical emitters 102-1 to 102-NN as being arranged in a square N×N array, other array shapes (e.g. ellipsoidal arrays or circular-shaped arrays) may be possible in other embodiments. Each of the optical emitters 102-1 to 102-NN may comprise one or more infrared sources, modulated light emitting diodes (LEDs), or semiconductor lasers, or combinations thereof, although other types of optical sources may be possible.

In various embodiments, where the optical emitters 102-1 to 102-NN comprise semiconductor lasers, an optical emitter 102-$i$ of the array of optical emitters 102-1 to 102-NN may comprise one or more vertical-cavity surface-emitting lasers (VCSELs), quantum well lasers, quantum cascade lasers, interband cascade lasers, or vertical external-cavity surface-emitting lasers (VECSELs), or the like.

The optical emitters 102-1 to 102-NN may be configured to operate at the same wavelength. In other embodiments, however, the optical emitters 102-1 to 102-NN may operate at different wavelengths. For example, the group 108 of optical sources and the group no of optical emitters 102-1 to 102-NN may operate at different wavelengths. The optical emitters 102-1 to 102-NN may exhibit continuous wave (CW) operation, quasi-continuous wave (QCW) operation, or pulsed operation.

Referring back to FIG. 1, in various embodiments, the ToF system 100 may comprise an optical source driver 112. The operation of the optical emitters 102-1 to 102-NN of the optical source 102 may be controlled by the optical source driver 112, which is configured to generate a drive current 114 that is capable of activating the array of optical emitters 102-1 to 102-NN, thereby causing the optical emitters 102-1 to 102-NN to emit photons.

In various embodiments, the array of optical emitters 102-1 to 102-NN may be an addressable array of optical emitters 102-1 to 102-NN. The array of optical emitters 102-1 to 102-NN may be individually addressable where an optical emitter 102-$i$ (shown in FIG. 2A) of the array of optical emitters 102-1 to 102-NN is addressable independently of another optical emitter 102-$j$ of the array of optical emitters 102-1 to 102-NN. The drive current 114 provided by the optical source driver 112 to the optical source 102 may cause an optical emitter 102-$i$ to be activated (and thereby emit a photon), while simultaneously causing optical emitter 102-$j$ to be deactivated (and thereby not emit a photon). In various embodiments, the optical emitters 102-1 to 102-NN may be addressable as a group or cluster, where one group 108 of optical emitters 102-1 to 102-NN is addressable independently of another group 110 of optical emitters 102-1 to 102-NN.

In various embodiments, the drive current 114 provided by the optical source driver 112 to the optical source 102 may cause the group 108 of optical emitters 102-1 to 102-NN to be activated (and thereby emit a photon), while simultaneously causing another group 110 of optical emitters 102-1 to 102-NN to be deactivated (and thereby not emit a photon).

Radiation (light) emanating from the optical source 102, collectively shown in FIG. 1 as reference numeral 116 using solid arrows, may be incident upon the object 101. The incident radiation 116 is reflected off the object 101 to produce reflected radiation 118. It is noted that although incident radiation 116 and reflected radiation 118 are represented in FIG. 1 by a few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 receives the reflected radiation 118 and generates an output signal 120 in response to the reflected radiation 118 striking the optical receiver 104.

FIG. 2B shows an enlarged view of the optical receiver 104, in accordance with an embodiment.

As depicted in FIG. 2B, the optical receiver 104 may comprise a plurality of radiation-sensitive pixels 104-1 to 104-KK. Although the example of FIG. 2B illustrates the radiation-sensitive pixels 104-1 to 104-KK as being arranged in a square K×K array, other array shapes (e.g. ellipsoidal arrays or circular-shaped arrays) may be possible in other embodiments.

The radiation-sensitive pixels 104-1 to 104-KK may comprise single-photon avalanche diodes (SPADs), photo diodes (PDs), avalanche photo diodes (APDs), or combinations thereof. In various embodiments, some or all of the plurality of radiation-sensitive pixels 104-1 to 104-KK may comprise a plurality of individual light-detecting sensors. The radiation-sensitive pixels 104-1 to 104-KK may generate an event signal each time they are hit by a photon.

As shown in FIG. 1, the ToF system boo further comprises a processor 126 configured to receive the output signal 120 from the optical receiver 104 to communicate the signals generated from the radiation-sensitive pixels 104-1 to 104-KK detect photons. The processor 126 may analyze the data and determine the proximity of the object 101, or objects, detected by the optical receiver 104 to the ToF system 100 based on the output signal 120.

The optical source driver 112 may be programmed to drive all the optical emitters 102-1 to 102-NN in the array of optical emitters 102-1 to 102-NN to generate incident radiation pulses. The optical emitters may be driven independently, in groups, or a whole. The optical source driver 112 may receive a control signal 134 from the processor 126 that initiates the optical source driver 112.

The radiation from the optical source 102 may be projected into the environment and reflected from object 101. In various embodiments, the emission may occur in a predetermined timing sequence or at predetermined timing intervals. The object 101 may reflect the incident radiation 116 and the arrival times of the pulses of reflected radiation 118 at the optical receiver 104 are proportional to twice the distance between the object 101 and the ToF system 100, based on the speed of light in the measurement medium or environment. The arrival time of a photon may be used to calculate the distance of an object that reflected the photon.

The optical source 102 may comprise semiconductor lasers (e.g. VCSELs), while the optical receiver 104 may comprise high-speed photodetectors (e.g. SPADs). The optical receiver 104 may be configured to record at least one of the arrival times, pulse shapes, or intensities of the pulses of reflected radiation 118. Reflected radiation 118 may arrive at different times at the optical receiver 104, depending on the respective distances between the different pails of the object 101 or other objects in the three-dimensional environment and the ToF system 100. The reflected radiation 118 may be detected synchronously with a timing signal configured to cause the optical source driver 112 to generate incident radiation 116. In various embodiments, the ToF system comprises a clock that may be used to control optical pulses and may be used for counting time delay between emission of the optical pulse and detection. The processor 126 may analyze the ToF between emission of incident radiation 116 travelling towards object 101 and arrival of reflected radiation 118 received at the optical receiver 104 to determine the proximity of the object 101 or objects in the three-dimensional environment. A plurality of proximity measurements may be used to generate a comprehensive set of data to accurately determine the depth (e.g. along the z-axis shown in FIG. 1) of the object or objects in the three-dimensional environment.

In various embodiments, photons counted at a radiation-sensitive pixel, or a group of radiation-sensitive pixels may be categorized based on ToF analysis to generate a histogram of estimated distances of the object or surface that reflected the radiation to the radiation-sensitive pixel. The ToF of a photon sensed at a radiation-sensitive pixel may be grouped into a bin based on the time of arrival of the photon at the optical receive 104. The time of arrival will correlate to the distance of the object from the ToF system ism. As additional photons are sensed during a measurement (or exposure), they may also be assigned to a bin. The various bins may accumulate a photon count and the distribution of photons in the various bins may be used to estimate the distance from the ToF system 100 of the reflective surface measured at the radiation-sensitive pixel.

Figure 3:
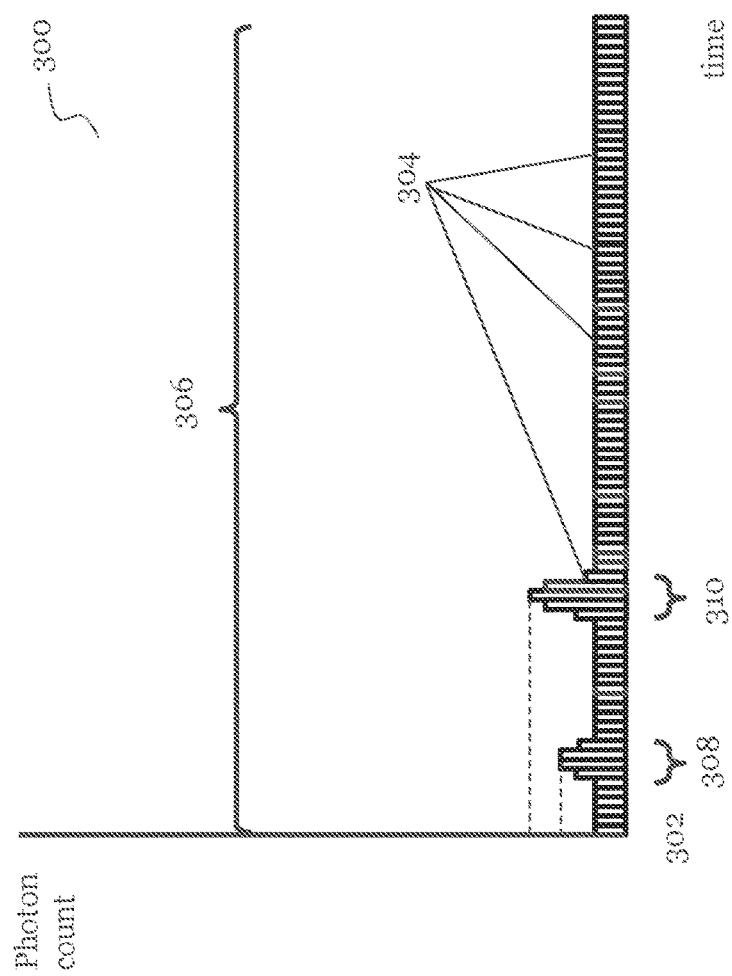
FIG. 3 depicts a histogram.

FIG. 3 depicts a histogram 300 of a photon count.

The vertical axis of the histogram 300 represents the magnitude of photons counted. The horizontal axis of the histogram represents time. An optical pulse may be emitted at an initial time 302 by the optical source 102. Photons detected during a counting period 306 may be detected as light projected by the optical pulse reflects from objects in the environment and to the optical receiver 104. The photons detected by the optical receiver may grouped depending on the time between the emission of an optical pulse and the time that they are detected. These groupings may be referred to as bins 304. For example, a 64-nanosecond counting period 306 may be divided into 64 periods, or bins, each period comprising a one nanosecond period. Each bin may also correspond to a distance range. Photons are grouped into the bins 304 that correspond to the time when they were detected. The detection events are counted to generate a histogram that reflects the magnitude of photons detected during different time periods. These time periods, as will be appreciated, may be correlated to distances based on the relationship between the time of flight of the photons and the speed of light. It should be appreciated, that the bins of the histogram may be alternatively represented as distance rather than time because of this relationship. As will be appreciated a histogram may be aggregated over multiple samples.

In various embodiments, a photon count may detect objects in the environment. These may be reflected by peaks in the photon count of the histogram 300. For example, a first peak 308 may correspond to a first object located at a first distance from the ToF system 100 in the environment, and a second peak 310 may correspond to a second object located at a second distance from the ToF system 100. It will be appreciated by one skilled in the art that ambient light detected by an optical receiver may result in noise in the signal.

Returning to FIG. 2B, in various embodiments, the radiation-sensitive pixels 104-1 to 104-KK may be divided into sections. A first sections 107 may comprise four radiation-sensitive pixels. Each radiation-sensitive pixel of the optical receiver 104 may belong to a section. Additional sections, (not shown) may comprise different radiation-sensitive pixels. As will be appreciated, in various embodiments, the number of radiation-sensitive pixels per section, or the number of sections per an optical receiver 104 may vary. For example, in various embodiments, each section of an optical receiver 104 may comprise 16 radiation-sensitive pixels. In various embodiments, each section of an optical receiver 104 may comprise 8, 32, 64, or any number of radiation-sensitive pixels. In various embodiments, a photon count may generate histogram for each section of radiation-sensitive pixels. For example, if optical receiver 104 comprises 64 groups of radiation-sensitive pixels, 64 histograms may be generated to range an environment for object.

It may be desirable to utilize sections of radiation-sensitive pixels to detect more reflected radiation and improve the signal-to-noise ratio of the output signal 120. In various embodiments, the individual radiation-sensitive pixels of one section may be combined by an OR tree for photon counting.

In various embodiments, the optical receiver 104 may comprise a lens 124 to direct photons from the environment into the sections of an optical receiver 104.

In various embodiments, the ToF system wo may comprise one or more time to digital converters. The one or more TDCs may measure the interval between the emission of incident radiation 116 from the optical source 102 and the arrival of reflected radiation 118 at the optical receiver 104 and provide it to the processor 126.

Data produced by a ToF system 100 may be used for to determine where to focus a lens of a camera for an autofocus algorithm. For example, a lens may be focused at a distance that corresponds to the distance of an object from a ToF system 100 where the distance of the object from the ToF system is determined from an analysis of one or more photon-count histograms. The ToF system 100 may output a distance at an output 113 that may be used for autofocusing.

Figure 4:
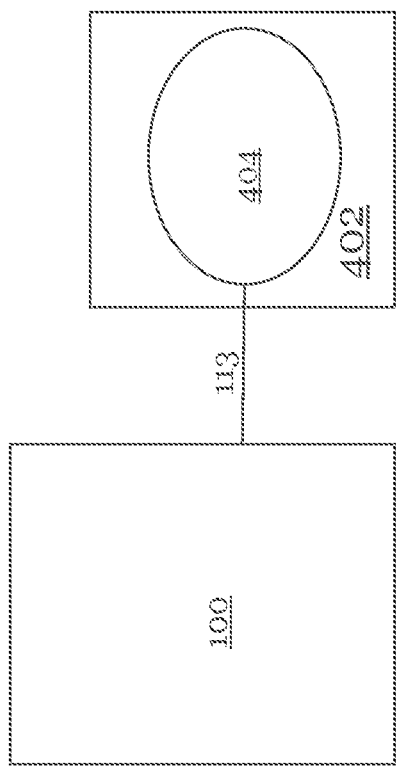
FIG. 4 depicts a ToF system coupled with a camera in accordance with an embodiment.

FIG. 4 depicts a ToF system coupled with a camera in accordance with an embodiment.

The output 113 of the ToF system 100 may communicate a distance to a camera 402. The camera 402 may use the distance communicated by the ToF system to autofocus a lens 404 of the camera according to the distance provided to the camera 402 by the ToF system 100. In various embodiments, the camera 402 and the ToF system may be incorporated into a single device, like a mobile phone. In various embodiments, the camera 402 may comprise the ToF system 100.

Figure 5:
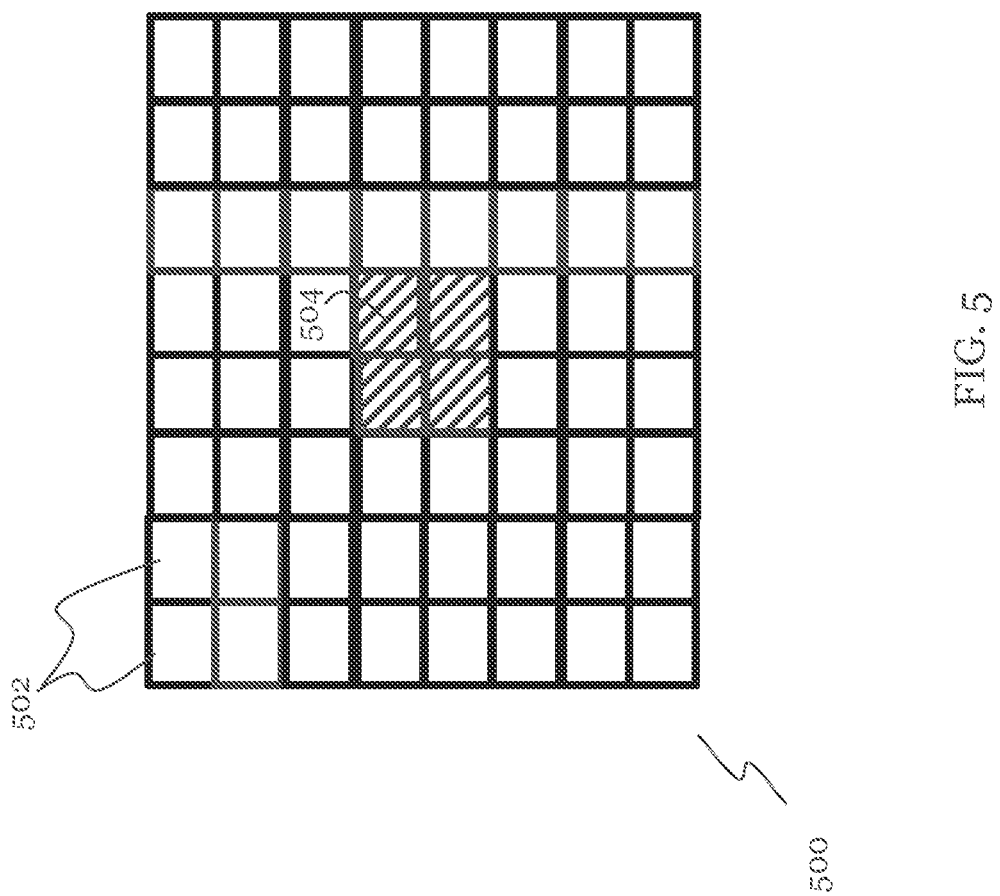
FIG. 5 depicts a field of view divided into zones in accordance with an embodiment.

FIG. 5 depicts a field of view 500 divided in zones 502.

The zones 502 of the field of view 500, in various embodiments, may correspond to the sections of an optical receiver 104. Each zone 502 of the field of view may be associated with a corresponding photon-count histogram produced from a section of the optical receiver that may be used to identify objects within that section of the field of view 500. For example, an optical receive 104 may comprise 64 sections that produce 64 photon-count histograms per sample, each photon-count histogram corresponding to one of 64 zones 502 of the field of view 500. The photon-counts for the sections of the optical receiver 104 may be referred to as the photon counts of the zones. And, objects in the field of view of a zone may be said to be captured when they may be identified by the corresponding photon count. The number of zones 502 of the field of view 500 may vary from embodiment to embodiment. The field of view 500 may be divided in a grid (like depicted in FIG. 4), however, in various embodiments the field of view 500 may be divided in different ways.

After the ToF system wo has sampled an environment (generated photon counts by projecting and receiving light), the ToF system 100 may analyze the photon-count histograms to determine a distance of an object that is outputted for autofocusing. In various embodiments, the photon-count histograms generated by a sample may identify multiple objects in an environment. So, it may be advantageous to identify one of the objects as a focal object.

In various embodiments, it may be advantageous to identify a focal sector 504 of the field of view 500 where the focal object may be located. The processor 126 may search for a focal object in photon-count histograms (searching for peaks) that correspond to the zones 502 falling within the focal sector 504. For example, if the focal sector 504 comprises four zones, the processor 126 may analyze the photon-count histograms corresponding to those four zones to identify a focal object or prospective focal objects.

In various embodiments, the focal sector 504 may comprise more or less zones 502. For example, the focal sector 504 may comprise 1, 2, 3, 4, 8 16, or any number of zones in various embodiments. In various embodiments, the location of the focal sector 504 may be identified based on user input. For example, a user may input a location in the field of view 500 to be searched for a focal object. This may be accomplished simply by touching an area in a field of view in a user interface.

In various embodiments, the focal sector 504 may be identified based on a predetermined parameter. For example, the focal sector 504 may be predetermined at a central location within a field of view 500. In various embodiments, a default setting may locate a focal sector 504 at a predetermined location that may be overridden by user input.

The processor 126 of the ToF system 100 may analyze the photon-counts for the zones of the focal sector 504 to search for objects. If one object is located in the focal sector 504, the processor may output the distance and that distance may be used for autofocusing. However, complications may arise when more than one object is identified within the focal sector 504. This can lead to confusion about the correct focal distance. A lens may undesirably shift the focal point of a lens between two or more distances thereby causing flicker. Confusion can also cause a lens to be focused at the wrong distance leading to difficulty capturing an image as desired by a user.

Figure 6:
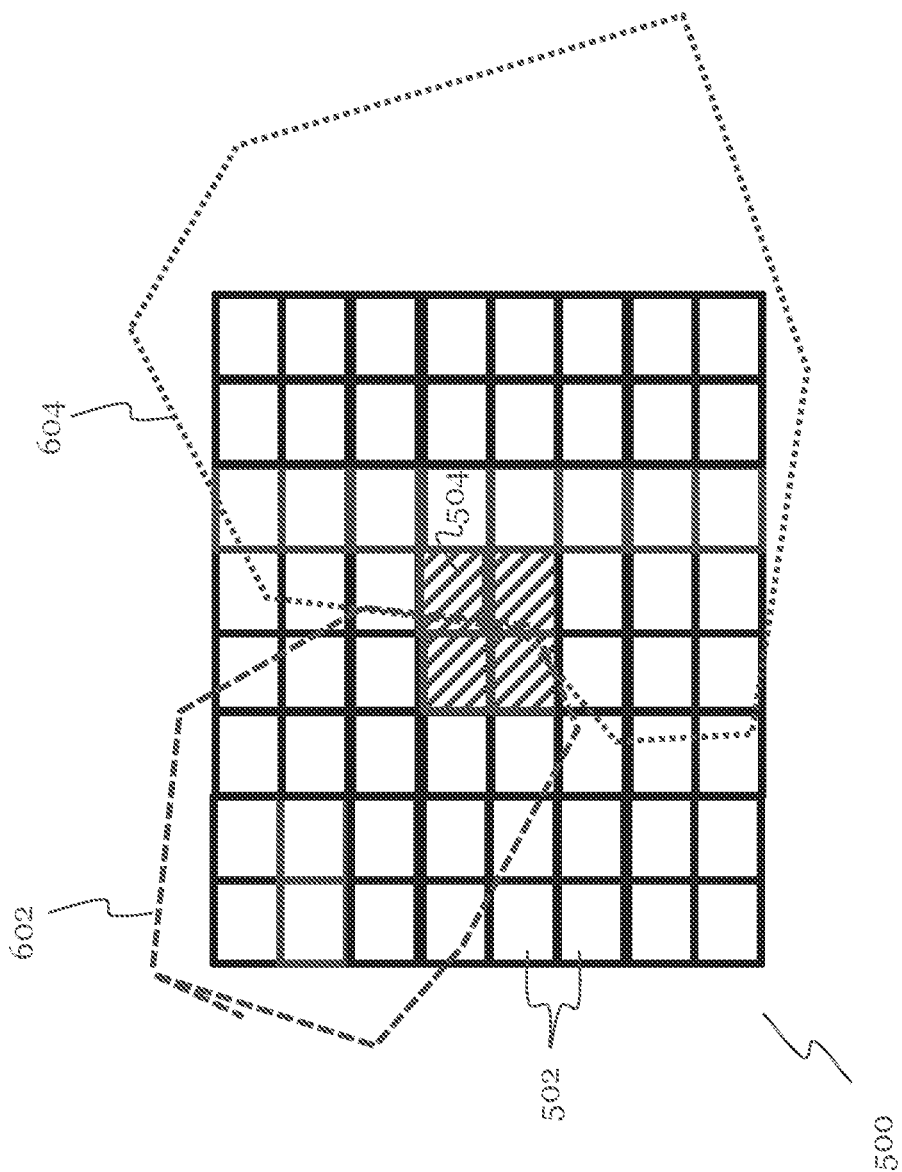
FIG. 6 depicts a Field of view with multiple objects identified in a focal sector in accordance with an embodiment.

FIG. 6 depicts a Field of view 500 with multiple objects identified in a focal sector 504.

Analyzing each zone of the plurality of zones within the focal sector 504, a first prospective focal object 602 located at a first distance from the ToF system wo may be identified in the focal sector 504 using the photon counts generated from a ToF sample. Additionally, analyzing each zone of the plurality of zones within the focal sector 504, a second prospective focal object 604 located at a second distance from the ToF system 100 may also be identified in the focal sector 504. It may be desirable to select one of the prospective focal objects as a final focal object where the lens of a camera may be focused. The first prospective focal object 602 may be detected in multiple zones of the focal sector 504. Likewise the second prospective focal object 604 may be detected in multiple zones of the focal sector 504. The first prospective focal object 602 and the second prospective focal object 604 may also be identified in some overlapping zones. For example, the first prospective focal object 602 may be identified in all the zones of the focal sector 504. And, the second prospective focal object 604 may also be identified in all the zones of the focal sector 504. Having multiple objects may make it difficult to determine the appropriate distance for output to an autofocus system, or other types of system. Additional prospective focal objects may also be identified within the focal sector 504.

Figure 7:
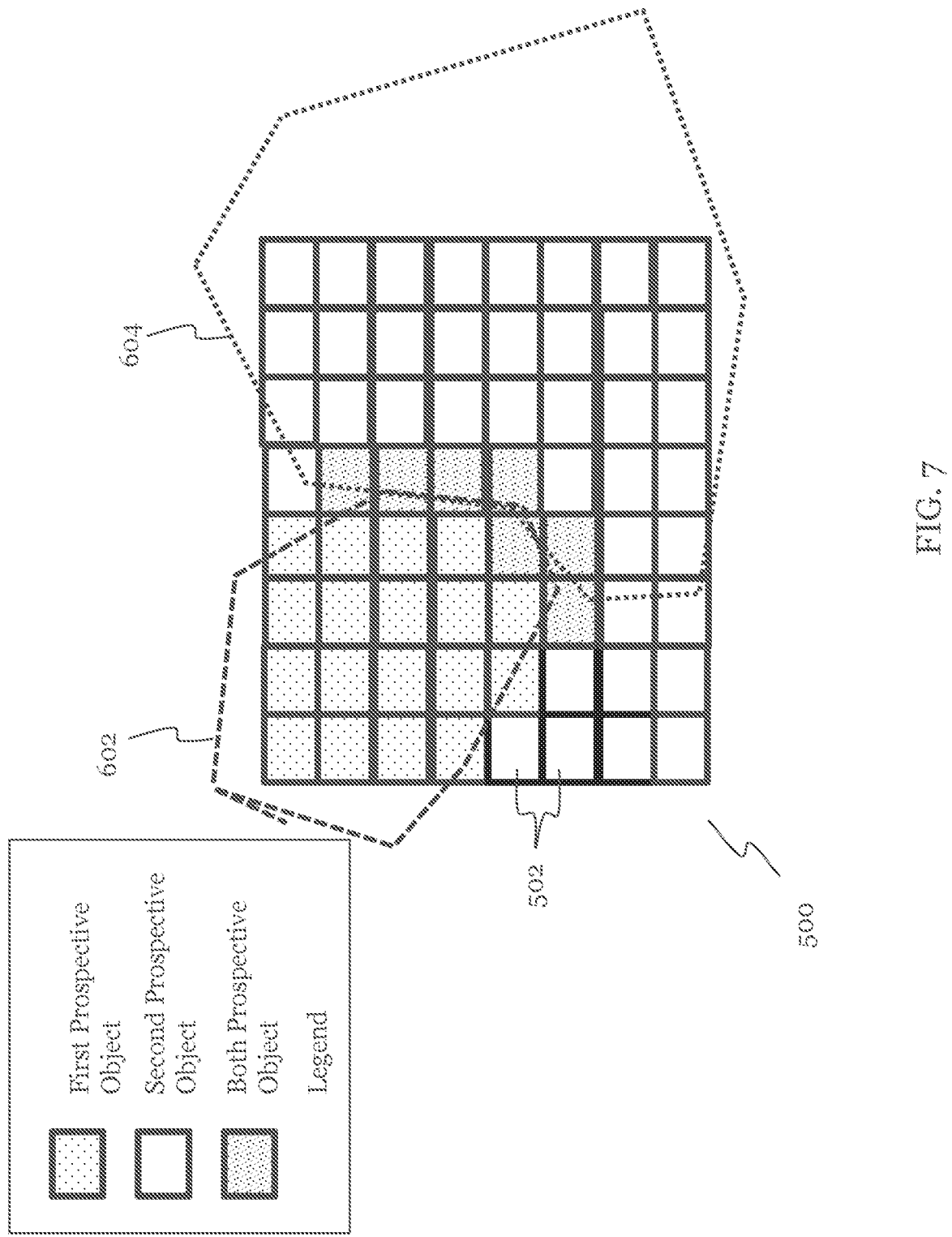
FIG. 7. depicts zones of a field of view where a first prospective focal object and a second prospective focal object are present.

FIG. 7. depicts zones of a field of view where a first prospective focal object and a second prospective focal object are present.

In various embodiments, the field of view 500 may be divided into a plurality of zones. The plurality of zones 502 may correspond to sections of an optical receiver 104 and each zone of the field of view may be sampled by a ToF system wo to generate a photon count for each zone of the plurality of zones. The example shown in FIG. 7 depicts a field of view 500 divided into 64 zones. It should be appreciated, however, that the field of view 500 may be divided into more or less zones in various embodiments.

A focal sector 504 (shown in FIG. 6) of the field of view 500 may be identified and each zone of the within the focal sector 504 may be analyzed to identify a first prospective focal object 602 and to identify a second prospective focal object 604 present in the focal sector 504. In various embodiments, additional prospective objects may be identified, and every object identified within any of the zones within the focal sector 504 may be identified as a prospective focal object. Identifying an object within a zone may be accomplished by looking for photon-count peaks in the photon count for the corresponding zone and calculating the corresponding distance. Each photon peak in each zone within the focal sector 504 may be identified and used as a distance for a prospective object.

It may be desirable to select a final focal object from the prospective focal objects. In various embodiments, the largest prospective focal object in the field of view 500 may be selected as the final focal object. For example, if the first prospective focal object 602 is bigger than the second prospective focal object 604, it may be advantageous to select the first prospective focal object as the final focal object. In this example, the final focal object distance may then comprise the distance of the first prospective focal object 602 from the ToF system 100. In various embodiments, the final focal object distance may be outputted from the ToF system. It should be appreciated that, in various embodiments, the final focal object distance may be processed in additional ways before being output. In various embodiments, the final focal object distance may be compared with results from previous ranges before data is output at least as described with reference to FIG. 8. If the first prospective focal object 602 is smaller than the second prospective focal object 604, second prospective focal object 604 may be selected as the final focal object. In various embodiments, the small object may be selected as the final focal object instead of the larger object.

It should also be appreciated that additional objects may be detected in the focal sector 504 so there may be more than two prospective focal objects. In various embodiments, each object detected within the focal sector 504 will be considered a prospective focal object.

Once objects within the focal sector 504 have been identified, it may be desirable to determine the sizes of the objects identified within the focal sector 504 to determine which object should be selected as a final focal object. This may be accomplished by counting the number of zones where the respective prospective focal objects may be identified in the histogram for the corresponding zone. To find all the zones where a prospective focal object is present, the processor may analyze the photon counts of all the zones of the field of view. For example, if the first prospective focal object 602 is identified as being at a distance of 300 mm, the processor may analyze the photon counts of every zone of the field of view 500 to find every zone with a photon count that has a peak at 300 mm plus and minus the threshold value. The first prospective focal object 602 may be considered to be present in every zone that has a photon count peak within the threshold distance of the first prospective focal object 602. If the threshold value is 5% of the distance (15 mm), the processor 126 will count every zone with a photon count that has a peak between 285 mm and 315 mm as a zone as being a zone where the first prospective focal object 602 is present. If the second prospective focal object 604 is determined to be located at 1500 mm, using the same 5% threshold, the processor 126 will count every zone with a photon count that has a peak between 1425 mm and 1575 mm as a zone where the second prospective focal object 604 is located. In various embodiments, the threshold may comprise a set distance rather than a percentage. The processor 126 may also store data related to the photon counts (such as the number of zones of each prospective focal object) in a memory 132.

In various embodiments, the prospective focal object present in the most zones of the field of view 50o may be considered the largest object and selected as the final-focal object. In FIG. 7, a first pattern is used to show the zones where the first prospective focal object 602 is present, a second pattern is used to show the zones where the second prospective focal object 604 is present, and a third pattern is used to show where both the first prospective focal object 602 and the second prospective focal object 604 are present. These zones may be counted to reveal that the first prospective focal object 602 is present in 25 zones. The second prospective focal object 604 is present in 39 zones. In this example, the second prospective focal object 604 is larger than the first prospective focal object 602 so it may be selected as the final focal object. In various embodiments, a user may be given an option to select either the larger object (the second prospective focal object 604 in this example) or the smaller object (the first prospective focal object 602 in this example).

In various embodiments, the processor 126 may search the photon count for each zone of the field of view 500 one at a time searching for peaks within a threshold of the first prospective focal object 602. For example, the processor may identify the peaks in a histogram for a first zone. If any of those peaks occur within a threshold distance of the distance of the first prospective focal object 602, then that zone may be identified as a zone where the first prospective focal object 602 is present. Then, the processor 126 may search the photon count for each zone of the field of view 500 one at a time searching for peaks located within a threshold of the second prospective focal object 604. This may continue for each prospective object identified with the focal sector 504.

In various embodiments, the processor 126 may search a first zone of the plurality of zone for a peak located within the threshold of the first prospective focal object 602. Then, the processor 126 may search the first zone for a peak located within the threshold of the second prospective focal object 604. Searches in the first zone may continue for each object identified with the focal sector 504. Then, this can be repeated for every other zone of the field of view 500.

As will be appreciated, due to variations in the photon count, the calculated distance of an object may vary from zone to zone. For example, the first prospective focal object 602 may be identified at a distance of 302 mm in a first zone of the focal sector 504 while the same object may be identified at 298 mm in a second zone of the focal sector 504 It may be undesirable to search each zone for peaks located within a threshold distance of 302 mm and perform another search for peaks located within the threshold distance of 298 mm because they may be likely to produce the same or similar results, which may be inefficient. To avoid redundant searches, it may be desirable to compare prospective focal objects to each other to determine if they are in a threshold distance of each other and discard prospective objects that are within the threshold of another prospective object.

Returning to FIG. 7, the first prospective focal object 602 appears in all four zones of the focal sector 504. The photon counts for each of the four zones may yield slightly different distances for the first prospective focal object 602. Likewise, the second prospective focal object 604 appears in 3 of the 4 zones of the focal sector 504. The photon counts for these three zones may yield three slightly different distances. Searching each zone for peaks located within a threshold distance of the four slightly different distances associated with the first prospective object 602, and searching the histograms of each zone for peaks located within a threshold distance of the three slightly different distances associated with the second prospective object 604 perform may yield very similar results and be inefficient. It may be preferable to perform one search for the first prospective object 602 and one search for the second prospective object 604. To avoid redundancies, prospective objects within a threshold of an earlier-identified prospective object may be removed from consideration so that only one search of the zones is performed for each prospective object. This may be accomplished by storing potential values in a memory 132 and comparing potential values with each other before performing searches in the zones of the field of view 500.

In various embodiments, the distances of prospective focal objects within a threshold of each other may be averaged before counting the zones where the prospective objects are present. For example, the four distances from the first prospective focal object 602 within the focal sector 504 may be averaged if they are within a threshold of each other. Then, the histograms of each zone may be searched for peaks located with the threshold distance of the averaged value. And, the same may be done for the three distances from the second prospective focal object 604 within the focal sector 504.

Once a final focal object has been selected, in various embodiments, it may be advantageous to average the distances from each of the zones where the selected object is present. For example, in FIG. 7, the second prospective focal object 604 is identified in 37 zones. The distance of the second prospective focal object 604 detected in each zone may be averaged together to find an averaged focal distance. This value may be output by the ToF system 100. This may be desirable to reduce the standard deviation of the value outputted by the ToF system 100. In various embodiments, it may also be desirable to average the signal strength, ambient light (noise), or the standard deviation for the final object.

In various embodiments, temporal filtering may also be utilized before the outputting the results. Temporal filtering may aid to reduce autofocus flicker caused by uneven changes in the distance output by the ToF system 100. For example, after a first ranging, a ToF system may output a first distance, and after a second ranging the ToF system may output a second distance. This may occur when the size of the prospective objects are close to each other. Output from subsequent ranges may also switch between the two distances. When paired with an autofocus algorithm and device, this may cause the autofocus to switch, undesirably, from the first distance to the second distance and back. This may detract from a user's experience. Temporal filtering may smooth uneven switching of the output of the ToF system.

In various embodiments, temporal filtering may comprise storing the distance previously output by the ToF system and storing distances selected from previous ranges as a final focal object distance (that may or may not have been output). In various embodiments, this information may be stored in the memory 132 and accessed by the processor 126 before data is output at the output 113. The distance selected from a current ranging (the distance of the final focal object or averaged distance of all the zones where the final focal object is present in various embodiments), may be compared with distances from previous ranges and distances previously output the ToF system 100.

Figure 8:
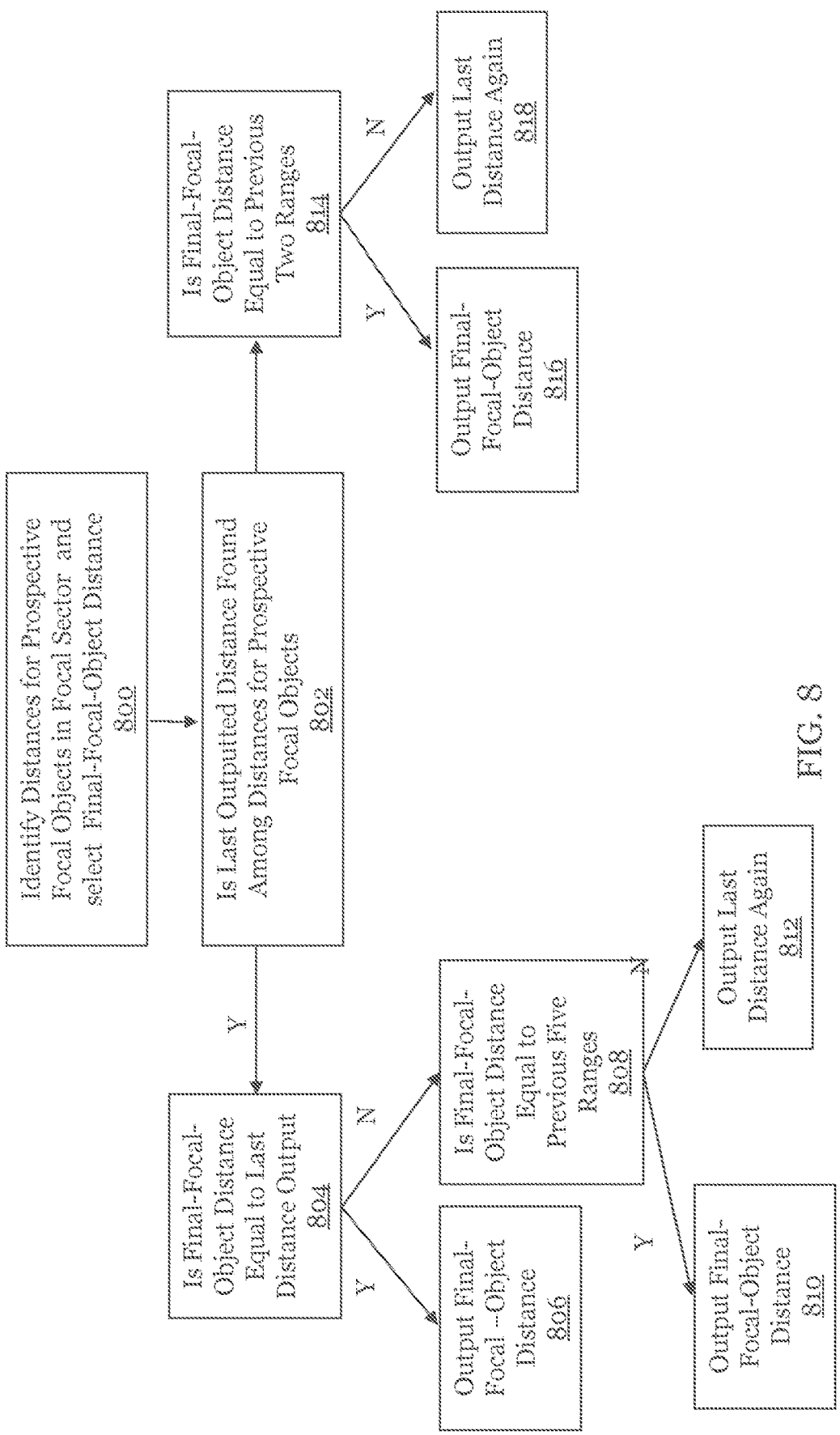
FIG. 8 depicts a flowchart of a method for outputting a distance with temporal filtering in accordance with an embodiment.

FIG. 8 depicts a flowchart of a method for outputting a distance with temporal filtering in accordance with an embodiment.

In various embodiments, at a step 800, the distances for prospective focal objects are identified during a current ranging. In various embodiments, this may be accomplished by searching the focal sector 504 as described elsewhere in this disclosure. A final focal object may be selected from the prospective focal objects as disclosed herein. This may comprise selecting the focal object that is identified in more zones of a field of view 500.

At a step 802, the distances of the prospective focal objects of the current ranging are compared with the last distance outputted by the ToF system 100. If the last distance outputted is found among the distances of the prospective focal objects (of the current ranging), at step 804, the final focal object distance (of the current ranging) may be compared with the last distance outputted. If the final focal object distance (of the current ranging) equals the last distance output, the final-final-focal object distance (of the current ranging) may be outputted at step 806. If they are not equal, at a step 808, the final focal object distance may compared with the final focal object distance of the previous five iterations (ranges) of the method to select a focal object. If the final focal object distance of the present iteration is equal to the previous five final focal distances, the final focal object distance of the present iteration may be output at 810. Otherwise, the last distance outputted by the ToF system 100 may be outputted again at step 812.

After step 802, if the last distance outputted (from the most recent iteration) is not found among the distances of the prospective focal objects, the final focal object distance of the present iteration may be compared with the final focal object distance of the previous two ranges at step 814. If the final focal object distance of the present iteration is equal to the final focal object distance of the previous two ranges, the final focal object distance (of the current iteration) may be output at step 816. Otherwise, the last distance outputted by the ToF system 100 may be output again at step 818.

In various embodiments, the number of ranges used for comparisons may vary. For example, at a step 808, the final focal object distance of a present range may be compared with the distance of the final focal object from 3, 6, 8, 10, or any number of previous ranges. In various embodiments, the final focal object distance may not need to be equal to every previous range. For example, the final focal object distance may only need to be equal to 4 of 5 previous ranges. Similarly, at a step 814, the final focal distance of a present range may be compared with the distance of the final focal object from more than two previous ranges or less than two previous ranges. In various embodiments, parameters may be adapted for different applications or design criteria.

Various embodiments of the temporal filter will now be further explained using some examples.

TABLE 1

| Prospective Focal Objects Found: |
| --- |
| 300 mm - 38 zones |
| 1.8 m - 36 zones |
| Last Distance Reported: |
| 1.8 m |
| Distances From Previous Ranges: |

TABLE 1-continued 300 mm
1.8 m
300 mm
1.8 m
300 mm
Output Distance:

1.8 m

Using the data from Table 1 as an example, in various embodiments, 300 mm may be selected as the final focal object distance because it appears in more zones than the alternative. For the example, the last distance output is 1.8 M, which is found among the prospective focal objects, so the final focal object distance (300 mm) may be compared with the last distance output at 804. From table 1, the last distance output (1.8 M) does not equal the final focal object distance (300 mm) so, at step 808, the final focal object distance is compared with the distances from the last 5 ranges. In this example, the final focal object distance is not equal to the last 5 ranges so the last distance output (1.8 M) may be outputted again.

TABLE 2

Prospective Objects Found:

300 mm - 38 zones
1.8 m - 37 zones
Last Distance Reported:

1.8 m
Previous Ranges:

300 mm
300 mm
300 mm
300 mm
300 mm
Output Distance:

300 mm

Using the data from Table 2 as an example, in various embodiments, 300 mm may, again, be selected as the final focal object distance because it appears in more zones than the alternative. The last distance output is 1.8 M, which is found among the prospective focal objects so the final focal object distance (300 mm) may be compared with the last distance output at step 804. From table 2, the last distance output (1.8 M) does not equal the final focal object distance (300 mm) so the final focal object distance is compared with the distances from the last 5 ranges. In this example, the final focal object distance is equal to the last 5 ranges so the final focal object distance (300 mm) may be outputted.

TABLE 3

Prospective Objects Found:

300 mm - 40 Zones
600 mm - 20 zones
Last Distance Reported:

1.8 m
Previous Ranges:

1.8 m
1.8 m
300 mm
300 mm

TABLE 3-continued 1.8 m
Output Distance:

1.8 m

Using data from Table 3 for another example, in various embodiments, 300 mm may, again, be selected as the final focal object distance because it appears in more zones than the alternative. The last distance output is 1.8 M, which is not found among the prospective focal objects so the final focal object distance (300 mm) may be compared with the previous two ranges at 914. In this example, the final focal object distance (300 mm) is not equal to the last two ranges so the last distance reported (1.8 M) may be output again at 818.

TABLE 4

Prospective Objects Found:

300 mm - 40 Zones
600 mm - 20 zones
Last Distance Reported:

1.8 m
Previous Ranges:

300 mm
1.8 m
300 mm
300 mm
1.8 m
Output Distance:

1.8 m

Using data from Table 4 for another example, in various embodiments, 300 mm may, again, be selected as the final focal object distance because it appears in more zones than the alternative. The last distance output is 1.8 M, which is not found among the prospective focal objects so the final focal object distance (300 mm) may be compared with the previous two ranges at 914. In this example, the final focal object distance (300 mm) is equal to the last two ranges so the final focal object distance (300 mm) may be output at 816.

Figure 9:
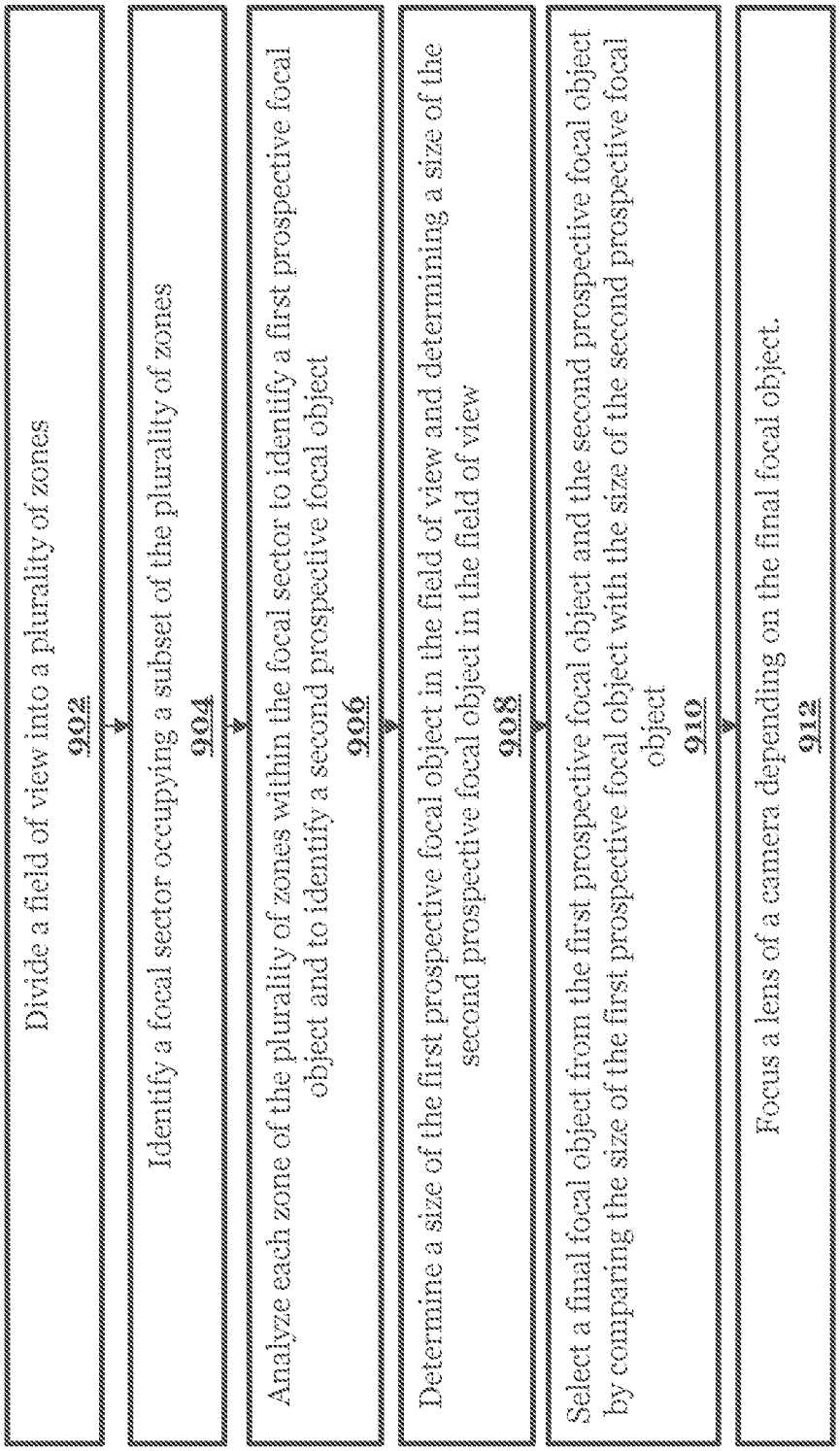
FIG. 9 depicts a method to identify a focal object in a field of view in accordance with an embodiment.

FIG. 9 depicts a method 900 to identify a focal object in a field of view in accordance with an embodiment.

In various embodiments, the method 900 may comprise at a step 902, dividing a field of view into a plurality of zones; at a step 904, identifying a focal sector occupying a subset of the plurality of zones; at a step 906, analyzing each zone of the plurality of zones within the focal sector to identify a first prospective focal object and to identify a second prospective focal object; at a step 908, determining a size of the first prospective focal object in the field of view and determining a size of the second prospective focal object in the field of view; and at a step 910 selecting a final focal object from the first prospective focal object and the second prospective focal object by comparing the size of the first prospective focal object with the size of the second prospective focal object; and at a step 912, focusing a lens of a camera depending on the final focal object.

In various embodiments, the method 900 may comprise, wherein the focal sector is identified based on user input.

In various embodiments, the method 900 may comprise, wherein the focal sector is identified based on a predetermined parameter.

In various embodiments, the method 900 may comprise, wherein the size of the first prospective focal object is determined by analyzing each zone of the plurality of zones and counting a first number of zones where the first prospective focal object is present and wherein the size of the second prospective focal object is determined by analyzing each zone of the plurality of zones and counting a second number of zones where the second prospective focal object is present.

In various embodiments, the method 900 may further comprise sampling the field of view with a Time of Flight system to generate a photon count for each zone of the plurality of zones and wherein the final focal object is located at a final focal object distance from the Time of Flight system.

In various embodiments, the method 900 may comprise, wherein counting the first number of zones comprises analyzing the photon count for each zone of the plurality of zones to identify each zone of the plurality of zones that captures an object within a threshold distance of the first prospective focal object and wherein counting the second number of zones comprises analyzing the photon count for each zone of the plurality of zones to identify each zone of the plurality of zones that captures an object within the threshold distance of the second prospective focal object.

In various embodiments, the method 900 may further comprise averaging the final focal object distance with a distance of each object within a threshold distance of the final focal object in each zone of the plurality of zones where the final focal object is present.

In various embodiments, the method 900 may comprise wherein, the field of view comprises a field of view of the Time of Flight System.

In various embodiments, the method 900 may further comprise determining that the final focal object distance is equal to a last distance previously outputted by the Time of Flight system and outputting the final focal object distance from the Time of Flight system to focus the lens of the camera.

In various embodiments, the method 900 may comprise determining that that the final focal object distance does not equal a last distance previously outputted by the Time of Flight system; determining that the final focal object distance is equal to a plurality of previously-identified final focal object distances; and outputting, by the Time of Flight system, the final focal object distance to focus the lens of the camera.

In various embodiments, the method 900 may further comprise determining that the final focal object distance does not equal a last distance previously outputted by the Time of Flight system; determining that the final focal object distance does not equal a plurality of previously identified final focal object distances; and outputting, by the Time of Flight system, the last distance previously outputted by the Time of Flight system to focus the lens of the camera.

In various embodiments, the method 900 may comprise, determining that a last distance previously outputted by the Time of Flight system is not equal to a distance of the first prospective focal object; determining that the last distance previously outputted by the Time of Flight system is not equal to a distance of the second prospective focal object; determining that the final focal object distance does not equal a plurality of previously-identified final focal object distances; and outputting, by the Time of Flight system the last distance previously outputted by the Time of Flight system to focus the lens of the camera.

In various embodiments, the method 900 may further comprise determining that a last distance previously outputted by the Time of Flight system is not equal to a distance of the first prospective focal object; determining that the last distance previously outputted by the Time of Flight system is not equal to a distance of the second prospective focal object; determining that the final focal object distance is equal to a plurality of previously-identified final focal object distances; and outputting, by the Time of Flight system, the final focal object distance to focus the lens of the camera.

In various embodiments, the method 900 may further comprise analyzing each zone of the plurality of zones within the focal sector to identify a third prospective focal object; determining a size of the third prospective focal object in the field of view; and wherein the size of the third prospective focal object is also compared with the size of the first prospective focal object and the second prospective focal object to select the final focal object from the first prospective focal object, the second prospective focal object, and the third prospective focal object.

Figure 10B:
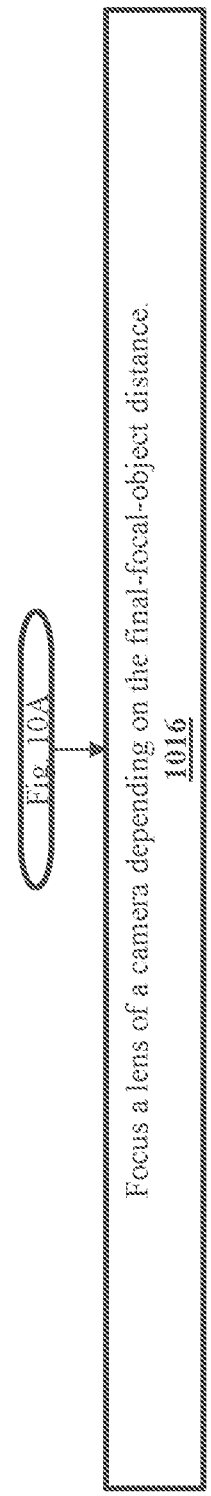

FIGS. 10A and 10B depict a method to identify a focal object in a field of view in accordance with an embodiment.

In various embodiments, the method moo may comprising, a step 1002 dividing a field of view of a Time of Flight system into a plurality of zones; at a step 1004, sampling the field of view with the Time of Flight system to generate a photon count for each zone of the plurality of zones; at a step 1006, identifying a focal sector occupying a subset of the plurality of zones; at a step 1008 analyzing each zone of the plurality of zones within the focal sector to identify a first prospective focal object and identify a second prospective focal object; at a step low determining a size of the first prospective focal object by analyzing a photon count for each zone of the plurality of zones to count each zone of the plurality of zones that captures an object within a threshold distance of the first prospective focal object; at a step 1012, determining a size of the second prospective focal object by analyzing the photon count for each zone of the plurality of zones to count each zone of the plurality of zones that captures an object within the threshold distance of the second prospective focal object; at a step 1014, selecting a final focal object from the first prospective focal object and the second prospective focal object by comparing the size of the first prospective focal object with the size of the second prospective focal object, the final focal object being located at a final focal object distance from the Time of Flight system; and at a step 1016, focusing a lens of a camera depending on the final focal object distance.

In various embodiments, the method moo may further comprise, adjusting the final focal object distance by averaging the final focal object distance with a distance of each object within the threshold distance of the final focal object in each zone of the plurality of zones where the final focal object is present.

In various embodiments, the method woo may further comprise analyzing each zone of the plurality of zones within the focal sector to identify a third prospective focal object; determining a size of the third prospective focal object by analyzing the photon count for each zone of the plurality of zones to count each zone of the plurality of zones that captures an object within the threshold distance of the third prospective focal object; and wherein the size of the third prospective focal object is compared with the size of the first prospective focal object and the size of the second prospective focal object to select the final focal object.

In various embodiments, the method woo may further comprise determining that the final focal object distance is equal to a last distance previously outputted by the Time of Flight system and outputting the final focal object distance from the Time of Flight system to focus the lens of the camera.

In various embodiments, the method woo may further comprise determining that the final focal object distance does not equal a last distance previously outputted by the Time of Flight system; determining that the final focal object distance is equal to a plurality of previously-identified final focal object distances; and outputting, by the Time of Flight system, the final focal object distance to focus the lens of the camera.

Example 1. A method to identify a focal object in a field of view, the method includes: dividing a field of view into a plurality of zones; identifying a focal sector occupying a subset of the plurality of zones; analyzing each zone of the plurality of zones within the focal sector to identify a first prospective focal object and to identify a second prospective focal object; determining a size of the first prospective focal object in the field of view and determining a size of the second prospective focal object in the field of view; selecting a final focal object from the first prospective focal object and the second prospective focal object by comparing the size of the first prospective focal object with the size of the second prospective focal object; and focusing a lens of a camera depending on the final focal object.

Example 2. The method of Example 1, further wherein, the focal sector is identified based on user input.

Example 3. The method of Example 1 or Example 2, wherein the focal sector is identified based on a predetermined parameter.

Example 4. The method of Example 1 to Example 3, wherein the size of the first prospective focal object is determined by analyzing each zone of the plurality of zones and counting a first number of zones where the first prospective focal object is present and wherein the size of the second prospective focal object is determined by analyzing each zone of the plurality of zones and counting a second number of zones where the second prospective focal object is present.

Example 5. The method of Example 1 to Example 4, further includes sampling the field of view with a Time of Flight system to generate a photon count for each zone of the plurality of zones and wherein the final focal object is located at a final focal object distance from the Time of Flight system.

Example 6. The method of Example 1 to Example 5, wherein counting the first number of zones comprises analyzing the photon count for each zone of the plurality of zones to identify each zone of the plurality of zones that captures an object within a threshold distance of the first prospective focal object and wherein counting the second number of zones comprises analyzing the photon count for each zone of the plurality of zones to identify each zone of the plurality of zones that captures an object within the threshold distance of the second prospective focal object.

Example 7. The method of Example 1 to Example 6, further includes averaging the final focal object distance with a distance of each object within a threshold distance of the final focal object in each zone of the plurality of zones where the final focal object is present.

Example 8. The method of Example 1 to Example 7, further wherein, the field of view comprises a field of view of the Time of Flight System.

Example 9. The method of Example 1 to Example 8, further includes: determining that the final focal object distance is equal to a last distance previously outputted by the Time of Flight system and outputting the final focal object distance from the Time of Flight system to focus the lens of the camera.

Example 10. The method of Example 1 to Example 9, further includes: determining that the final focal object distance does not equal a last distance previously outputted by the Time of Flight system; determining that the final focal object distance is equal to a plurality of previously identified final focal object distances; and outputting, by the Time of Flight system, the final focal object distance to focus the lens of the camera.

Example 11. The method of Example 1 to Example 10, further includes: determining that that the final focal object distance does not equal a last distance previously outputted by the Time of Flight system; determining that the final focal object distance does not equal a plurality of previously identified final focal object distances; and outputting, by the Time of Flight system, the last distance previously outputted by the Time of Flight system to focus the lens of the camera.

Example 12. The method of Example 1 to Example 11, further includes: determining that a last distance previously outputted by the Time of Flight system is not equal to a distance of the first prospective focal object; determining that the last distance previously outputted by the Time of Flight system is not equal to a distance of the second prospective focal object; determining that the final focal object distance does not equal a plurality of previously-identified final focal object distances; and outputting, by the Time of Flight system the last distance previously outputted by the Time of Flight system to focus the lens of the camera.

Example 13. The method of Example 1 to Example 12 further including determining that a last distance previously outputted by the Time of Flight system is not equal to a distance of the first prospective focal object; determining that the last distance previously outputted by the Time of Flight system is not equal to a distance of the second prospective focal object; determining that the final focal object distance is equal to a plurality of previously-identified final focal object distances; and outputting, by the Time of Flight system, the final focal object distance to focus the lens of the camera.

Example 14. The method of Example 1 to Example 13, further includes analyzing each zone of the plurality of zones within the focal sector to identify a third prospective focal object; determining a size of the third prospective focal object in the field of view; and wherein the size of the third prospective focal object is also compared with the size of the first prospective focal object and the second prospective focal object to select the final focal object from the first prospective focal object, the second prospective focal object, and the third prospective focal object.

Example 15. A system including: a Time of Flight system configured to detect a photon count for each zone of a plurality of zones of a field of view; a processor in communication with the Time of Flight system and a memory comprising an instruction set to be executed in the processor, the instruction set when executed causing the processor to: identify a focal sector occupying a subset of the plurality of zones, analyze each zone of the plurality of zones within the focal sector to identify a first prospective focal object and to identify a second prospective focal object, determine a size of the first prospective focal object and determine a size of the second prospective focal object, and select a final focal object from the first prospective focal object and the second prospective focal object by comparing the size of the first prospective focal object with the size of the second prospective focal object, the final focal object being located at a final focal object distance from the Time of Flight system; and a lens focus system configured to focus a lens of a camera depending on the final focal object.

Example 16. The system of Example 15, wherein the Time of Flight system includes: an optical source configured to emit light into an environment; and an optical receiver comprising a plurality of light-sensitive pixels to detect photons being reflected from the environment, the plurality of light-sensitive pixels arranged in a plurality of sections corresponding to the plurality of zones.

Example 17. The system of Example 15 or Example 16, wherein the Time of Flight system includes the processor and wherein the processor receives the photon count for each zone of the plurality of zones from the optical receiver.

Example 18. The system of Example 15 to Example 17, wherein the optical receiver comprises an optical-receiver lens to direct photons to the plurality of sections.

Example 19. A method to identify a focal object in a field of view, the method including: dividing a field of view of a Time of Flight system into a plurality of zones; sampling the field of view with the Time of Flight system to generate a photon count for each zone of the plurality of zones; identifying a focal sector occupying a subset of the plurality of zones; analyzing each zone of the plurality of zones within the focal sector to identify a first prospective focal object and identify a second prospective focal object; determining a size of the first prospective focal object by analyzing a photon count for each zone of the plurality of zones to count each zone of the plurality of zones that captures an object within a threshold distance of the first prospective focal object; determining a size of the second prospective focal object by analyzing the photon count for each zone of the plurality of zones to count each zone of the plurality of zones that captures an object within the threshold distance of the second prospective focal object; selecting a final focal object from the first prospective focal object and the second prospective focal object by comparing the size of the first prospective focal object with the size of the second prospective focal object, the final focal object being located at a final focal object distance from the Time of Flight system; and focusing a lens of a camera depending on the final focal object distance.

Example 20. The method of Example 19, further includes adjusting the final focal object distance by averaging the final focal object distance with a distance of each object within the threshold distance of the final focal object in each zone of the plurality of zones where the final focal object is present.

Example 21. The method of Example 19 or Example 20, further includes analyzing each zone of the plurality of zones within the focal sector to identify a third prospective focal object; determining a size of the third prospective focal object by analyzing the photon count for each zone of the plurality of zones to count each zone of the plurality of zones that captures an object within the threshold distance of the third prospective focal object; and wherein the size of the third prospective focal object is compared with the size of the first prospective focal object and the size of the second prospective focal object to select the final focal object.

Example 22. The method of Example 19 to Example 21, further includes determining that the final focal object distance is equal to a last distance previously outputted by the Time of Flight system and outputting the final focal object distance from the Time of Flight system to focus the lens of the camera.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
    dividing a field of view of a Time of Flight system into a plurality of zones;
    sampling the field of view with the Time of Flight system to generate a photon count for each zone of the plurality of zones;
    identifying a focal sector occupying a subset of the plurality of zones;
    analyzing each zone of the plurality of zones within the focal sector to identify a first prospective focal object and a second prospective focal object;
    determining a size of the first prospective focal object by analyzing a photon count for each zone of the plurality of zones to count each zone of the plurality of zones that captures an object within a threshold distance of the first prospective focal object;
    determining a size of the second prospective focal object by analyzing the photon count for each zone of the plurality of zones to count each zone of the plurality of zones that captures an object within the threshold distance of the second prospective focal object;
    selecting a final focal object from the first prospective focal object and the second prospective focal object by comparing the size of the first prospective focal object with the size of the second prospective focal object, the final focal object being located at a final focal object distance from the Time of Flight system; and
    focusing a lens of a camera based on the final focal object distance.

2. The method of claim 1, wherein the focal sector is identified based on user input or a predetermined parameter.

3. The method of claim 1, further comprising adjusting the final focal object distance by averaging the final focal object distance with a distance of each object within a threshold distance of the final focal object in each zone of the plurality of zones where the final focal object is present.

4. The method of claim 1, further comprising:
    analyzing each zone of the plurality of zones within the focal sector to identify a third prospective focal object; and
    determining a size of the third prospective focal object by analyzing the photon count for each zone of the plurality of zones to count each zone of the plurality of zones that captures an object within a threshold distance of the third prospective focal object, wherein the size of the third prospective focal object is compared with the size of the first prospective focal object and the size of the second prospective focal object to select the final focal object.

5. The method of claim 1, further comprising:
    determining that the final focal object distance is equal to a last distance previously outputted by the Time of Flight system; and
    outputting the final focal object distance from the Time of Flight system to focus the lens of the camera.

6. The method of claim 1, further comprising:
    determining that that the final focal object distance does not equal a last distance previously outputted by the Time of Flight system;

determining that the final focal object distance is equal to a plurality of previously identified final focal object distances; and outputting the final focal object distance to focus the lens of the camera.

7. The method of claim 1, further comprising:

emitting, by an optical source, light into an environment;

detecting, by a plurality of light-sensitive pixels of an optical receiver, photons being reflected from the environment, the plurality of light-sensitive pixels arranged in a plurality of sections corresponding to the plurality of zones; and directing, by an optical-receiver lens of the optical receiver, photons to the plurality of sections.

8. A method, comprising:

dividing a field of view of a Time of Flight System into a plurality of zones;

sampling the field of view with the Time of Flight system to generate a photon count for each zone of the plurality of zones;

identifying a focal sector occupying a subset of the plurality of zones;

identifying a first prospective focal object and a second prospective focal object;

determining a size of the first prospective focal object and a size of the second prospective focal object;

selecting a final focal object from the first prospective focal object and the second prospective focal object by comparing the size of the first prospective focal object with the size of the second prospective focal object, and wherein the final focal object is located at a final focal object distance from the Time of Flight system; and focusing a lens of a camera depending on the final focal object.

9. The method of claim 8, wherein the focal sector is identified based on user input or a predetermined parameter.

10. The method of claim 8, further comprising adjusting the final focal object distance by averaging the final focal object distance with a distance of each object within a threshold distance of the final focal object in each zone of the plurality of zones where the final focal object is present.

11. The method of claim 8, further comprising:

analyzing each zone of the plurality of zones within the focal sector to identify a third prospective focal object; and determining a size of the third prospective focal object by analyzing the photon count for each zone of the plurality of zones to count each zone of the plurality of zones that captures an object within a threshold distance of the third prospective focal object, wherein the size of the third prospective focal object is compared with the size of the first prospective focal object and the size of the second prospective focal object to select the final focal object.

12. The method of claim 8, further comprising:

determining that the final focal object distance is equal to a last distance previously outputted by the Time of Flight system; and outputting the final focal object distance from the Time of Flight system to focus the lens of the camera.

13. The method of claim 8, further comprising:

determining that that the final focal object distance does not equal a last distance previously outputted by the Time of Flight system;

determining that the final focal object distance is equal to a plurality of previously identified final focal object distances; and outputting the final focal object distance to focus the lens of the camera.

14. The method of claim 8 further comprising:

emitting, by an optical source, light into an environment;

detecting, by a plurality of light-sensitive pixels of an optical receiver, photons being reflected from the environment, the plurality of light-sensitive pixels arranged in a plurality of sections corresponding to the plurality of zones; and directing, by an optical-receiver lens of the optical receiver, photons to the plurality of sections.

15. A Time of Flight system, comprising:

a non-transitory memory storage comprising instructions; and a processor in communication with the non-transitory memory storage, wherein the processor is configured to execute the instructions to:

divide a field of view of the Time of Flight System into a plurality of zones;

sample the field of view with the Time of Flight system to generate a photon count for each zone of the plurality of zones;

identify a focal sector occupying a subset of the plurality of zones;

identify a first prospective focal object and a second prospective focal object;

determine a size of the first prospective focal object and a size of the second prospective focal object;

select a final focal object from the first prospective focal object and the second prospective focal object by comparing a size of the first prospective focal object with a size of the second prospective focal object, and wherein the final focal object is located at a final focal object distance from the Time of Flight system; and focus a lens of a camera depending on the final focal object.

16. The Time of Flight system of claim 15, wherein the focal sector is identified based on user input or a predetermined parameter.

17. The Time of Flight system of claim 15, wherein the processor is configured to execute the instructions to adjust the final focal object distance by averaging the final focal object distance with a distance of each object within a threshold distance of the final focal object in each zone of the plurality of zones where the final focal object is present.

18. The Time of Flight system of claim 15, wherein the processor is configured to execute the instructions to:

analyze each zone of the plurality of zones within the focal sector to identify a third prospective focal object; and determine a size of the third prospective focal object by analyzing the photon count for each zone of the plurality of zones to count each zone of the plurality of zones that captures an object within a threshold distance of the third prospective focal object, wherein the size of the third prospective focal object is compared with the size of the first prospective focal object and the size of the second prospective focal object to select the final focal object.

19. The Time of Flight system of claim 15, wherein the processor is configured to execute the instructions to:

determine that the final focal object distance is equal to a last distance previously outputted by the Time of Flight system; and output the final focal object distance from the Time of Flight system to focus the lens of the camera.

20. The Time of Flight system of claim 19, further comprising:
- an optical source configured to emit light into an environment; and
- an optical receiver comprising:
  - a plurality of light-sensitive pixels to detect photons being reflected from the environment, the plurality of light-sensitive pixels arranged in a plurality of sections corresponding to the plurality of zones, and
  - an optical-receiver lens to direct photons to the plurality of sections.

* * * * *